United States Patent
Fang et al.

(10) Patent No.: US 9,917,988 B2
(45) Date of Patent: Mar. 13, 2018

(54) METHOD FOR DETECTING OCCLUSION AREAS

(71) Applicant: MEDIATEK INC., Hsin-Chu (TW)

(72) Inventors: Hung-Chi Fang, Yilan County (TW); Fang-Chen Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 575 days.

(21) Appl. No.: 14/248,361

(22) Filed: Apr. 9, 2014

(65) Prior Publication Data

US 2015/0296102 A1  Oct. 15, 2015

(51) Int. Cl.
*H04N 7/12* (2006.01)
*H04N 5/14* (2006.01)
*H04N 19/553* (2014.01)
*H04N 7/01* (2006.01)

(52) U.S. Cl.
CPC ............ *H04N 5/145* (2013.01); *H04N 7/014* (2013.01); *H04N 7/0142* (2013.01); *H04N 19/553* (2014.11)

(58) Field of Classification Search
CPC ...... H04N 5/145; H04N 19/00; H04N 19/553; H04N 7/014; H04N 7/0142
USPC ................ 375/240.12, 240.16; 348/699
See application file for complete search history.

(56) References Cited

U.S. PATENT DOCUMENTS

| 6,487,313 B1 | 11/2002 | De Haan et al. |
| 7,058,227 B2 | 6/2006 | De Haan et al. |
| 7,995,793 B2 | 8/2011 | Mertens |
| 2007/0268964 A1* | 11/2007 | Zhao ............... H04N 19/56 375/240.1 |
| 2012/0033130 A1* | 2/2012 | Piek ............... G06T 7/2006 348/441 |
| 2012/0044998 A1* | 2/2012 | Kokaram ......... G06T 7/2006 375/240.16 |
| 2014/0254686 A1* | 9/2014 | Lim ............... H04N 19/52 375/240.16 |

FOREIGN PATENT DOCUMENTS

CN          1266948 C       7/2006

OTHER PUBLICATIONS

Combined Chinese Office Action and Search Report dated Aug. 8, 2017 in Patent Application No. 201410322857.5 (with English Translation of Category of Cited Documents).

* cited by examiner

*Primary Examiner* — Farzana Hossain
(74) *Attorney, Agent, or Firm* — Oblon, McClelland, Maier & Neustadt, L.L.P.

(57) ABSTRACT

A method and apparatus for occlusion area detection based on block difference associated with a motion vector and a predicted block difference are disclosed. For each current block of a frame, motion estimation is performed based on a temporally previous frame and a temporally subsequent frame. Based on the motion vector derived, two reference blocks of the current block are located in the temporally neighboring frames. The block difference between these two reference blocks is calculated for the current block. By comparing the block difference with a predicted block difference of the current block, the current block is determined to be an occlusion block or not accordingly. The predicted block difference is updated by averaging the block difference of neighboring blocks in a non-motion boundary area.

16 Claims, 6 Drawing Sheets

METHOD FOR DETECTING OCCLUSION AREAS

FIELD OF THE INVENTION

The present invention relates to image processing. In particular, the present invention relates to detecting occlusion areas in pictures of a video sequence.

BACKGROUND

Occlusion areas are parts of a scene which are visible in one frame and become invisible in a neighboring frame of multiple consecutive images due to blockage by foreground object(s). Each of the consecutive images can be a picture captured by imaging system or an interpolated image based on captured pictures. For consecutive images captured by a camera, the presence of the occlusion areas is caused by the changing of relative position between the objects and the camera. When parts of the image become invisible, at least a portion of a background object is covered by a foreground object located closer to the camera due to the projection. Vice versa, the foreground object is located farther away from the camera in the scene and parts of the background become uncovered. The parts of the background object which become covered or uncovered are referred to as occlusion areas. When the areas become covered or uncovered, the uniquely matched areas in neighboring images cannot be found by motion estimation. Therefore, special care must be taken in addressing the occlusion problem, otherwise artifacts may occur in temporal interpolation.

Figure 1:
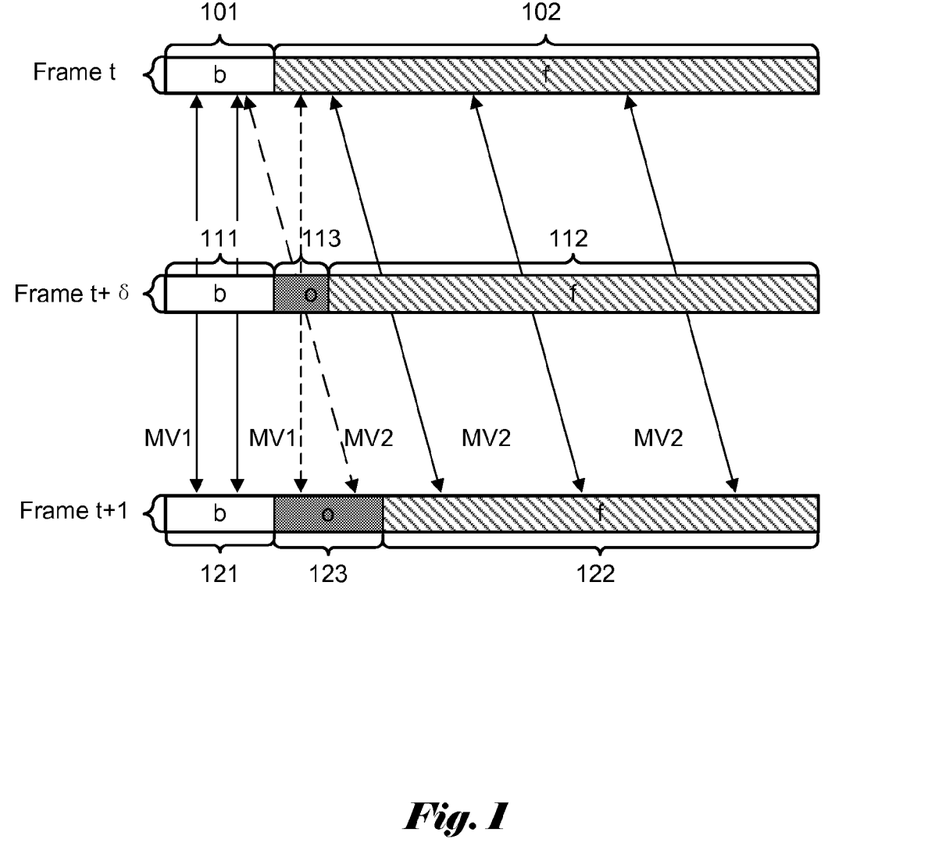
FIG. 1 illustrates an example of occlusion detection based on two motion vectors.

In a conventional method, occlusion detection is based on pixel differences associated with two motion vectors between two consecutive images (U.S. Pat. No. 7,995,793). One of the two motion vectors may be zero, which corresponds to a background that is stationary relative to the camera. FIG. 1 illustrates an example of occlusion detection based on two motion vectors between two consecutive frames, Frame (t) and Frame (t+1) captured by an imaging system. Frame (t+δ) is to be temporally interpolated based on Frame (t) and Frame (t+1). Two motion vectors (i.e., MV1 and MV2) are determined to describe the motion between the two frames, where MV1=0 corresponds to zero motion for the background areas.

Frame (t+δ) is formed by projecting Frame (t) to Frame (t+1) according to one of the two motion vectors. For example, area 111 in Frame (t+δ) is formed by projecting area 101 in Frame (t) to area 121 in Frame (t+1) according to motion vector MV1 since good match between area 101 and area 121 can be found using motion vector MV1. Similarly, area 112 in Frame (t+δ) is formed by projecting area 102 in Frame (t) to area 122 in Frame (t+1) according to motion vector MV2 since good match can be found between area 102 and 122 using motion vector MV2. Nevertheless, for area 113 in Frame (t+δ), none of the motion vectors can result in good match between corresponding areas in Frame (t) and Frame (t+1). In other words, the pixel differences are large for corresponding areas in Frame (t) and Frame (t+1) associated with area 113 in Frame (t+δ) regardless which of the two motion vectors is used.

While the above method works successfully to a certain degree, it is desirable to develop an occlusion detection method to improve the accuracy of detection and/or reduce associated computational complexity.

BRIEF SUMMARY OF THE INVENTION

A method and apparatus for detecting an occlusion area in a current image are disclosed. Embodiments according to the present invention provide a block-based method to improve the efficiency or reduce the computation complexity of image processing with occlusion detection.

According to one embodiment of the present invention, the current block in the current image is determined whether it is an occlusion area based on a block difference and a predicted block difference associated with the block. The method comprises determining a motion vector and a block difference for the current block, receiving a predicted block difference and comparing the block difference and the predicted block difference. The block difference is determined based on a first reference block in the first neighboring image and a second reference block in the second neighboring image. The current block may be identified as an occlusion area if the block difference is larger than the predicted block difference by a threshold.

The motion vector for the current block is determined based on a first neighboring image and a second neighboring image. The current image is temporally located between the first neighboring image and the second neighboring image. The motion vector may be a bidirectional motion vector which is determined based on both forward and backward estimation between the first and the second neighboring images. The bidirectional motion vector can be determined based on a minimum block difference calculated between candidate reference blocks in the first neighboring image and the second neighboring image.

The block difference may be determined based on respective pixel differences between the first and the second reference blocks. The first reference block and the second reference block can be located using the current block and the motion vector. The first reference block may be located by offsetting a first location corresponding to the current block in the first neighboring image by the motion vector in one direction. The second reference block may be located by offsetting a second location corresponding to the current block in the second neighboring image by the motion vector in an opposite direction. The block difference may correspond to a sum of absolute differences between values of corresponding pixels in the first reference block and the second reference block.

The predicted block difference may be determined based on one or more neighboring block differences associated with one or more neighboring blocks which are not in any motion boundary. The process of calculating the predicted block difference may also include determine whether the current block is in a motion boundary. If the current block is not in any motion boundary, the predicted block difference may be updated according to the average of the block difference and said one more neighboring block differences.

According to one embodiment of the present invention, an apparatus for detecting an occlusion area in a current image comprises one or more electronic circuits. The current image may be temporally located between the first neighboring image and the second neighboring image. Said one or more electronic circuits are configured to determine a motion vector and a block difference for a current block in the current image, receive a predicted block difference and determine whether the current block is an occlusion block. The current block may be determined to be one occlusion block if the block difference is larger than the predicted block difference by a threshold.

The motion vector is determined based on a first neighboring image and a second neighboring image. The motion vector may correspond to a bi-directional motion vector determined based on both forward motion estimation and backward motion estimation between the first neighboring image and the second neighboring image. A first reference block and a second reference block are located using the current block and the motion vector. The block difference can be determined based on the first reference block in the first neighboring image and the second reference block in the second neighboring image. The calculation of the block difference is based on respective pixel differences between the first reference block and the second reference block. The block difference may correspond to a sum of absolute differences between values of corresponding pixels in the first reference block and the second reference block.

DETAILED DESCRIPTION OF THE INVENTION

In the present invention, a block-based method is developed to detect occlusion areas of an image based on two neighboring images. The current image may be an existing image or an image to be interpolated between two neighboring images. Each block of the current image is processed to determine whether it is an occlusion block or not. An occlusion block is referred to a block of pixels that contains one or more occluded pixels. In another word, at least one pixel of the occlusion block is located in the occlusion areas of the image.

Figure 2:
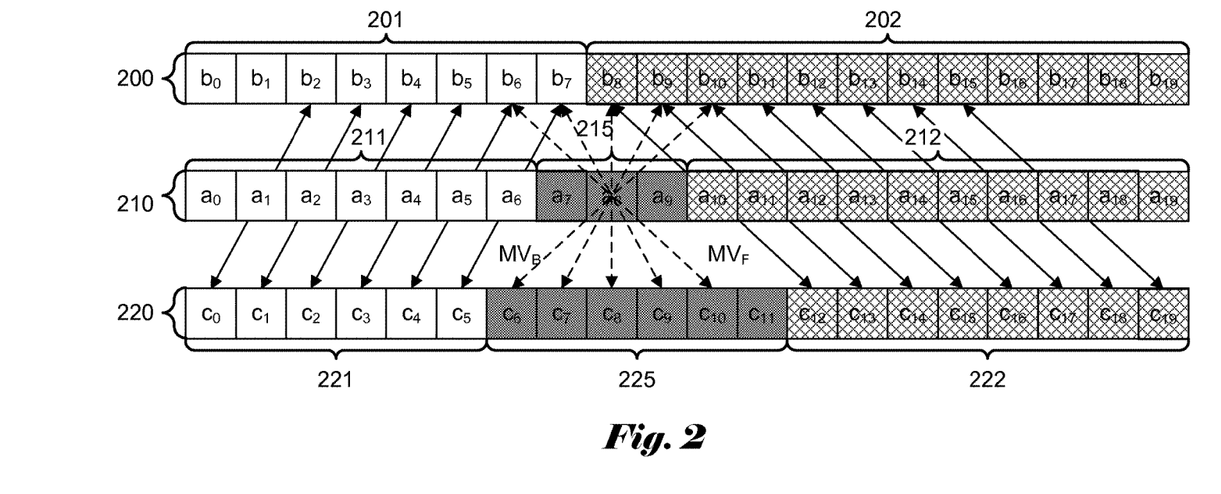
FIG. 2 illustrates an example of matched blocks of two neighboring frames used to predict an interpolated frame.

FIG. 2 illustrates an example of matched blocks determined by bidirectional motion estimation performed on two neighboring frames of one interpolated frame according to an embodiment of the present invention. Frame 200 and frame 220 are two consecutive pictures captured, where frame 220 corresponds to a later frame in time than frame 200. Frame 200 comprises a background area shown by area 201 and a foreground area shown by area 202. Frame 220 also comprises a background area shown by area 221 which is matched with area 201 of frame 200. The foreground area shown by area 222 in frame 220 is matched with part of area 202. Frame 220 also comprises a newly uncovered area shown by area 225 which cannot be matched with any area in frame 200. The matched blocks in frame 200 and frame 220 are found by bidirectional motion estimation. The relationship between matched blocks in frame 200 and frame 220 can be determined using motion estimation techniques. For example, motion vector $MV_F$ may be derived for the foreground area as shown by the arrows in FIG. 2. Block-based motion estimation may be used and the technique is well known in the art. Therefore the details are not described here. It is noted that the length of each arrow has no relation with the length of any bidirectional motion vector. Similarly, motion estimation may also be applied to the background area to determine the motion vector $MV_B$ and the matching blocks in frame 200 and frame 220. In the example of FIG. 2, blocks $c_0$, $c_1$, $c_2$, $c_3$, $c_4$ and $c_5$ in area 221 are matched with blocks $b_2$, $b_3$, $b_4$, $b_5$, $b_6$ and $b_7$ in area 201, respectively. Similarly, blocks $c_{12}$, $c_{13}$, $c_{14}$, $c_{15}$, $c_{16}$, $c_{17}$, $c_{18}$ and $c_{19}$ in area 222 are matched with blocks $b_8$, $b_9$, $b_{10}$, $b_{11}$, $b_{12}$, $b_{13}$, $b_{14}$, and $b_{15}$ in area 202, respectively. For occlusion area 225, no block in frame 200 can be matched with newly uncovered blocks $c_6$, $c_7$, $c_8$, $c_9$, $c_{10}$ and $c_{11}$.

Frame 200 and frame 220 are used to form the interpolated frame 210. As shown by FIG. 2, frame 210 comprises a background area 211, a newly uncovered background area 215 and a foreground area 212. Background area 211 can be interpolated based on corresponding area 201 in frame 200 and area 221 in frame 220. Similarly, foreground area 212 can be interpolated based on area 202 in frame 200 and area 222 in frame 220. Blocks $a_0$, $a_1$, $a_2$, $a_3$, $a_4$ and $a_5$ can be interpolated based on matched block pairs $(b_2, c_0)$, $(b_3, c_1)$, $(b_4, c_2)$, $b_5, c_3)$, $(b_6, c_4)$ and $(b_7, c_5)$, respectively. Blocks $a_9$ to $a_{16}$ can be interpolated based on matched block pairs $(b_8, c_{12})$ to $(b_{15}, c_{19})$. In FIG. 2, the size of the motion vectors $MV_B$ and $MV_F$ is just indicative of matching blocks between frame 200 and frame 220. As is well known in the art of motion estimation, the block matching is performed in two-dimensional space and the motion vector usually consists of horizontal component and vertical component. Each of the blocks corresponds to a two-dimensional pixel array. The one-dimensional drawing in FIG. 2 is used to simplify the illustration. Furthermore, while the blocks $a_i$, $b_i$ and $c_i$ are drawn aligned vertically, it does not imply that the motion vector size is measured by the block size. For example, FIG. 2 may correspond to the match in the horizontal direction. The horizontal block may correspond to 8 pixels. While block $b_i$ is matched with block $c_{i+4}$ in the foreground area as shown in FIG. 2, it does not necessarily imply the horizontal motion vector is 32 pixels (i.e., 4×8 pixels).

In the example of FIG. 2, for area 215, various motion vectors (indicated by dashed lines) are searched and none of them can find matched areas between frame 220 and frame 200. Thus, block $a_6$, $a_7$ and $a_8$ are identified as occlusion blocks. The interpolation of the occlusion blocks has to be performed carefully. Otherwise, it may cause artifacts in the occlusion area.

In the present invention, the block-based method using motion estimation is performed on the two neighboring images to provide information used for occlusion detection. The information for processing the current block comprises the motion vector and the block difference between two reference blocks the two neighboring images. By the motion estimation, the two reference blocks for the current block can be found in the two neighboring images. The two reference blocks associated with a motion vector may be considered matched depending on the differences between the two reference blocks. The relationship between the two reference blocks of the current block being processed is given by the motion vector for the current block. The block difference for processing the current block is calculated between the corresponding pixels of the two reference blocks.

The block difference can be compared with a predicted block difference. If the previous blocks are in a non-occlusion area and the current block difference is within a range of the predicted block difference, the current block is determined to be a foreground block or a background block. If the block difference is much larger than the predicted block difference, the current block is determined to be an occlusion block. In other words, the delta between the current block difference is compared with the predicted block difference. If the delta exceeds the threshold, the current block is declared to be an occlusion block. Otherwise, it is in foreground or background. The threshold can be predetermined.

Various block difference can be used. For example, the sum of absolute difference (SAD) between corresponding pixels in two reference blocks can be used as the block difference for the current block being processed. Then the current block can be identified as an occlusion block if the SAD exceeds the predicted SAD by the threshold.

According to one embodiment of the present invention, the motion vector for the current block is determined based on the minimum SAD between pixel values in candidate blocks of two neighboring images. All the motion vectors can be determined by using symmetric-bidirectional motion estimation, where the motion vector is measured at the current block location and the motion vector between frame 200 and frame 220 is determined based on two symmetric motion vectors pointing from the current block to two reference blocks in frames 200 and 220 in opposite directions. In the above case, the current image is assumed to be temporally located in the middle of frames 220 and 220. If the current image is not in the middle of frames 200 and 220 temporally, the two opposite motion vectors have to be scaled according to the temporal distance. Each of the two reference blocks of the current block is located by offsetting one location corresponding to the current block in one neighboring image by the motion vector in one direction. The minimum SAD corresponding to the motion vector is used as the SAD for processing the current block. The predicted SAD can be determined adaptively based on SADs of previous blocks in a non-occlusion area. For example, the predicted SAD for the current block can be calculated by averaging the SADs of previous blocks which are not within any motion boundary according to one embodiment of the present invention. The SAD value calculated for the motion boundary may be less accurate so it is recommended to excluding motion boundary SADs for calculating the predicted SAD. In the present invention, the motion boundary denotes an area wherein the motion vector for processing each block is different from at least one neighboring motion vector.

Figure 3:
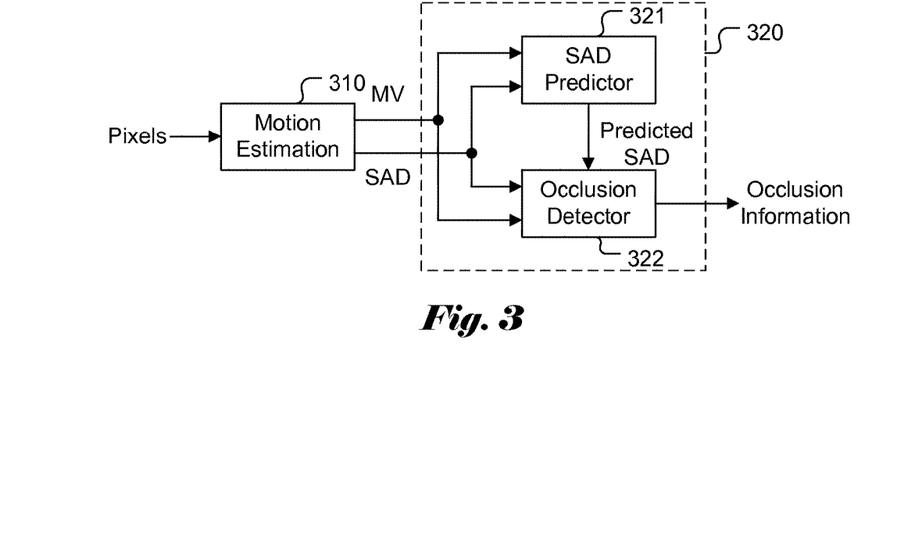
FIG. 3 illustrates an exemplary flow chart for determining occlusion areas of an image according to one embodiment of the invention.

FIG. 3 illustrates an exemplary diagram for detecting occlusion blocks by comparing the SAD and the predicted SAD for each block according to one embodiment of the present invention. Motion estimation 310 is performed for a current block based on the pixels associated with the two neighboring images. The result of motion estimation can determine a motion vector and an associated SAD for the current block. The motion vector and the SAD for the current block are received by occlusion detection unit 320.

In the embodiment shown by FIG. 3, the occlusion detection unit comprises a SAD predictor 321 and occlusion detector 322. SAD predictor 321 provides a predicted SAD for the current block based on the current motion vector and the SADs received from motion estimation 310. In one embodiment, the predicted SAD is computed by averaging the received SADs for the previous blocks in the image. A moving average may be used where the average is computed based the past N blocks. By comparing the SAD and the predicted SAD for the current block, occlusion detector 322 can determine whether the current block is an occlusion block or not. If the SAD received from motion estimation 310 is much larger than the predicted SAD given by the SAD predictor, the current block is identified as an occlusion block. To determine whether the SAD is much larger than the predicted SAD, a threshold can be used as a criterion.

Figure 4A:
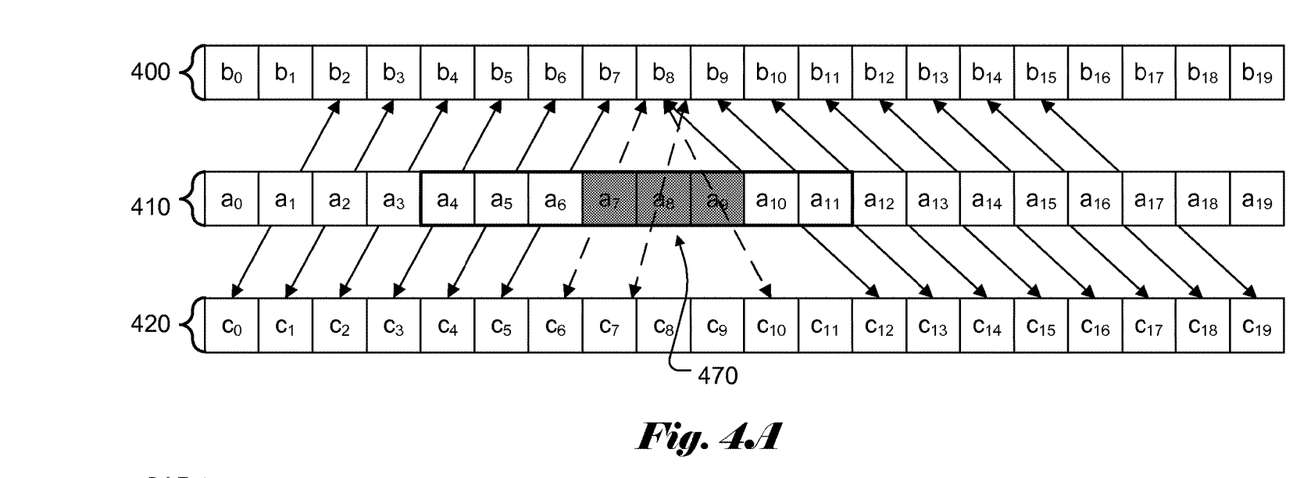
FIG. 4A illustrates an example of motion vectors determined for occlusion detection according to one embodiment of the present invention.
Figure 4B:
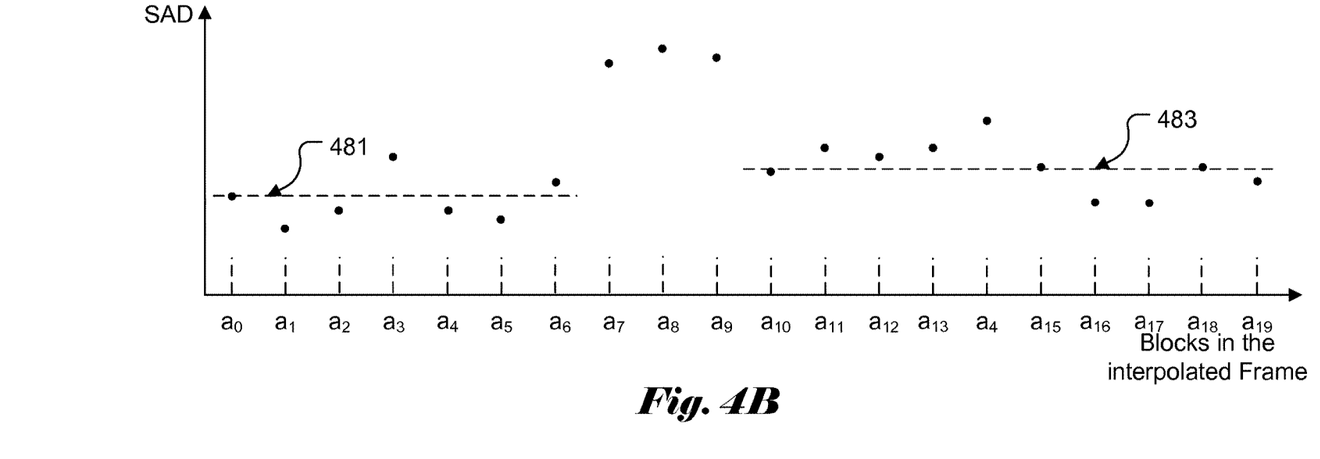
FIG. 4B illustrates an example of SADs (sum of absolute value differences) determined for each block of the interpolated frame shown in FIG. 4A.

FIGS. 4A and 4B illustrate an example for determining occlusion blocks according to the present invention. In this example, the motion boundary related to an occlusion area contains blocks from both foreground and background area. Furthermore, the motion vectors shown by the dashed arrows for occlusion blocks are similar to the motion vectors for non-occlusion blocks. To detect the occlusion block according to one embodiment of the present invention, symmetric-bidirectional motion estimation is performed for each of the current blocks (i.e., $a_0, \ldots, a_{19}$) based on two captured frames 400 and 420. Frame 410 is interpolated based on the captured frame pair. The motion vector for each block of frame 410 may be determined based on the minimum SAD computed between candidate blocks in the captured frame pair. Each bidirectional arrow in FIG. 4A represents a bidirectional motion vector which gives the relationship between the reference blocks of an interpolated block. The length of each arrow has no relation with any motion vector. Each interpolated block is processed to determine whether it is an occlusion block or not according to the minimum SAD corresponding to the motion vector and a predicted SAD for the block. By analysis of neighboring motion vectors, the motion boundary or boundaries of frame 410 can be determined. For example, an abrupt change in the motion vector may indicate the existence of a motion boundary. As shown in FIG. 4A, motion boundary 470 is identified, where the motion boundary consists of blocks $a_7$-$a_9$. As shown in FIG. 4A, blocks $a_1$-$a_6$ are in a foreground area or a background area. Similarly, blocks $a_{10}$-$a_{17}$ are in another foreground area or a background area. The predicted SADs for blocks $a_7$-$a_9$ can be determined based on neighboring blocks in a non-boundary area. For example, the predicted SAD can be determined based on the average SAD of N neighboring non-boundary blocks. For example, N may be 3. The average SAD may also be calculated based on all neighboring blocks in a non-boundary area. The predicted SADs 481 and 483 are shown in FIG. 4B for the non-boundary area on the left side and the right side respectively. By comparing the SAD and the predicted SAD, the occlusion area shown by shaded blocks $a_7$, $a_8$ and $a_9$ is detected in frame 410.

Figure 5A:
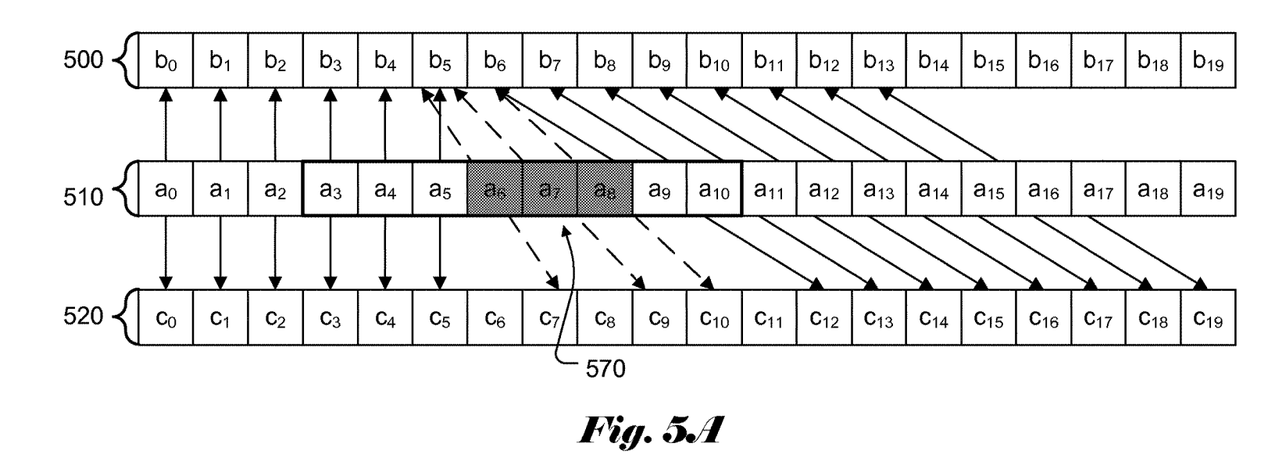
FIG. 5A illustrates another example of motion vectors determined for occlusion detection according to one embodiment of the present invention.
Figure 5B:
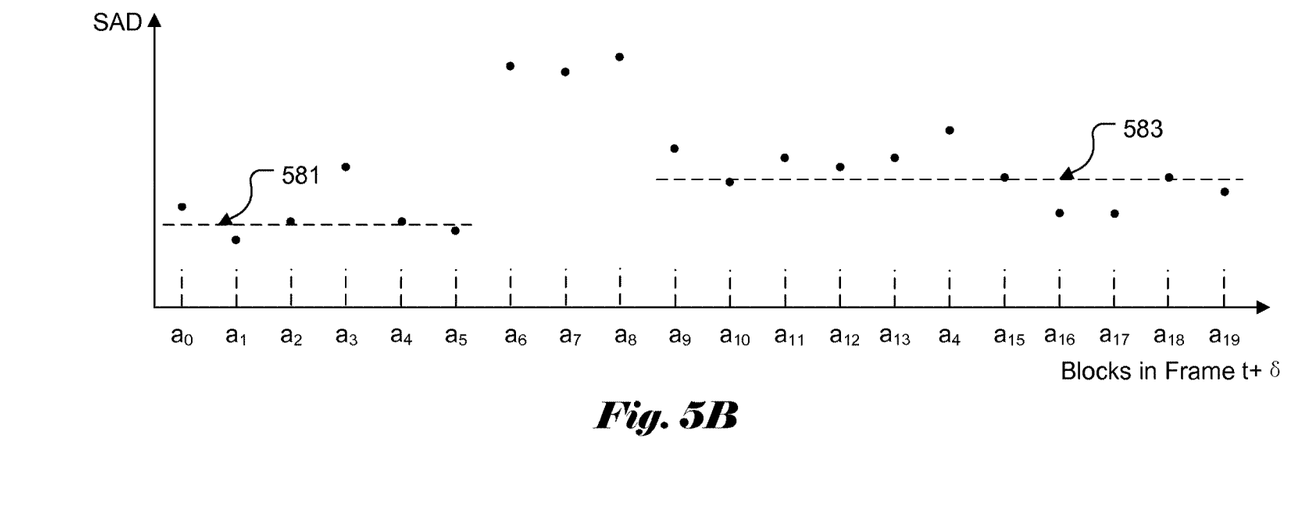
FIG. 5B illustrates an example of SADs (sum of absolute value differences) determined for each block of the interpolated frame shown in FIG. 5A.

FIGS. 5A and 5B illustrate another example for determining occlusion blocks according to the present invention. Different from the example shown in FIGS. 4A and 4B, the motion vectors shown by the dashed arrows for occlusion blocks are different to those motion vectors for non-occlusion blocks. Frame 510 is interpolated based on captured frames 500 and 520. The motion vector for each block of frame 510 is determined based on minimum SAD computed between candidate blocks in the captured frame 500 and 520. By analysis of the bidirectional motion vectors, the motion boundary of frame 510 can be determined. As shown in FIG. 5A, motion boundary 570 consists of blocks $a_6$, $a_7$ and $a_8$. By comparing the SAD and the predicted SAD of each block, the determined occlusion area consists of blocks $a_6$, $a_7$, and $a_8$ in frame 510.

FIG. 5B illustrates an example of the SAD and predicted SAD calculated for each block in frame 510. The predicted SAD for the blocks in motion boundary 570 is determined based on the average of the previous SADs. If block $a_0$ to block $a_2$ are the previous blocks outside the motion boundary, the predicted SAD 581 equals to the average of SADs determined for block $a_0$ to block $a_2$. Similarly, the predicted SAD 583 for these blocks in the motion boundary equals to the average of the SADs determined for block $a_{12}$ to block $a_{16}$ if the processing order is from another side.

Figure 6A:
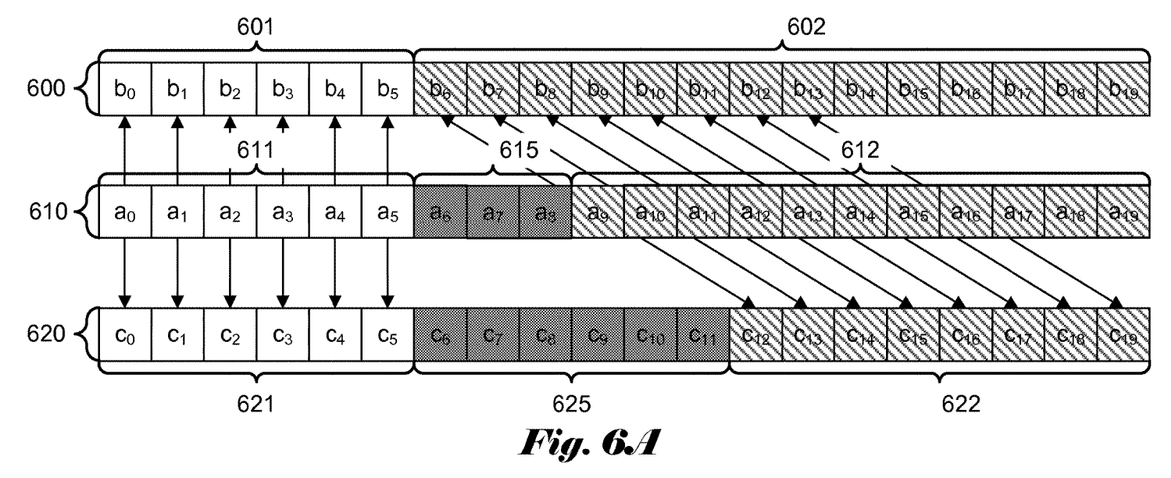
FIG. 6A illustrates an example of matched blocks of two neighboring frames used to predict an interpolated frame.
Figure 6B:
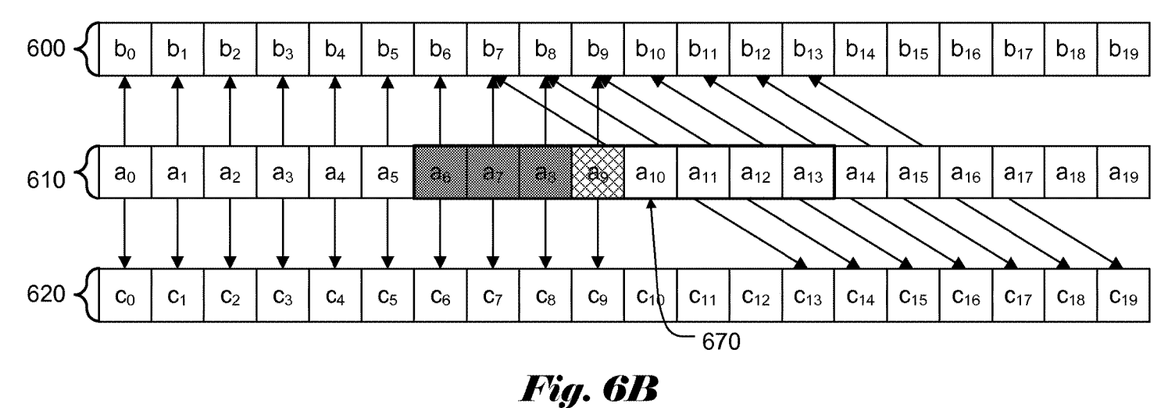
FIG. 6B illustrates an example of motion vectors determined based on the motion estimation of the two captured frames shown in FIG. 6B.

FIGS. 6A and 6B illustrate an example of the motion boundary located in the foreground. In this example, the motion boundary consists of blocks locates in the foreground area of frame 610. FIG. 6A is used for illustrating the matched blocks in frame 600 and frame 620. The bidirectional arrows show the relationship between matched blocks. Blocks $c_0$, $c_1$, $c_2$, $c_3$, $c_4$ and $c_5$ in area 621 are matched with blocks $b_0$, $b_1$, $b_2$, $b_3$, $b_4$ and $b_5$ in area 601, respectively. Similarly, blocks $c_{12}$, $c_{13}$, $c_{14}$, $c_{15}$, $c_{16}$, $c_{17}$, $c_{18}$ and $c_{19}$ in area 622 are matched with blocks $b_6$, $b_7$, $b_8$, $b_9$, $b_{10}$, $b_{11}$, $b_{12}$, and $b_{13}$ in area 602, respectively. For occlusion area 625, no block in frame 200 can be uniquely matched with newly uncovered blocks $b_6$, $b_7$, $b_8$, $b_9$, $b_{10}$ and $b_{11}$. Blocks $a_0$, $a_1$, $a_2$, $a_3$, $a_4$ and $a_5$ should be interpolated based on matched block pairs $(b_0, c_0)$, $(b_1, c_1)$, $(b_2, c_2)$, $(b_3, c_3)$, $(b_4, c_4)$ and $(b_5, c_5)$, respectively. Blocks $a_9$ to $a_{16}$ should be interpolated based on matched block pairs $(b_6, c_{12})$ to $(b_{12}, c_{19})$.

FIG. 6B illustrates the motion vectors obtained by using bidirectional motion estimation according to the present invention. Frame 610 is interpolated based on captured frame 600 and frame 610. Each arrow in FIG. 6B shows the relationship between two reference blocks of each interpolated block being processed. For example, the reference blocks of block $a_6$ are block $b_6$ and $c_6$ which are connected by an arrow. As shown in FIG. 6B, motion boundary 670 consists of blocks $a_6$, $a_7$, $a_8$, $a_9$, $a_{10}$, $a_{11}$, $a_{12}$ and $a_{13}$ based on the analysis of the motion vectors shown by the arrows. According to the actual situation illustrated by FIG. 6A, block $a_9$ should be interpolated by block $b_6$ and block $c_{12}$. However, the reference blocks of $a_9$ are $b_9$ and $c_9$ determined according to the present invention, as shown by FIG. 6B. As $b_9$ and $c_9$ are not matched with each other, the block difference such as SAD between these two blocks may be larger than that between block $b_6$ and block $c_{12}$. If the block difference for block $a_9$ is larger than the predicted block difference by a threshold, block $a_9$ is mistaken as an occlusion block. This results in the broken of the foreground in the interpolated frame.

Figure 7A:
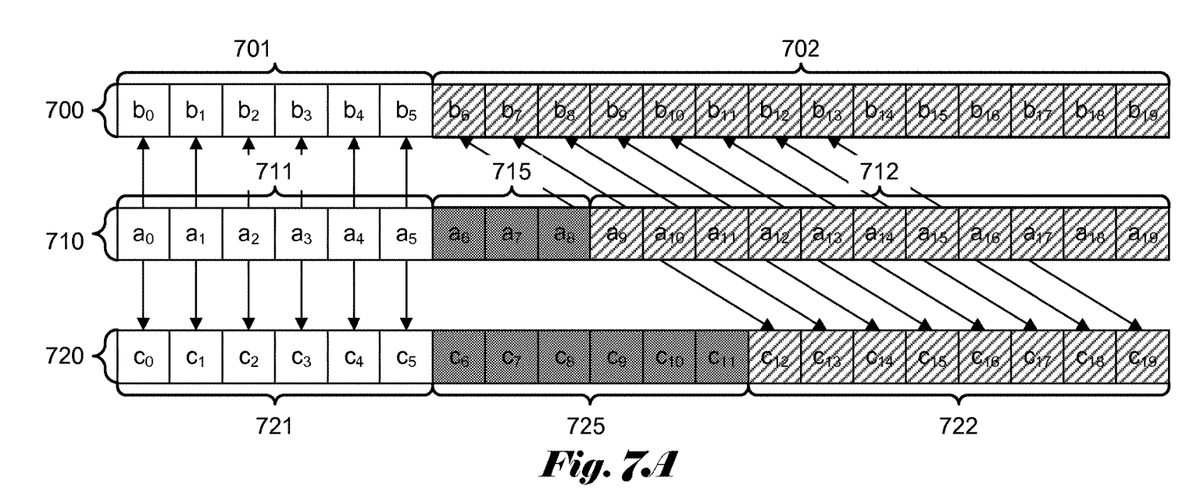
FIG. 7A illustrates another example of matched blocks of two neighboring frames used to predict an interpolated frame.
Figure 7B:
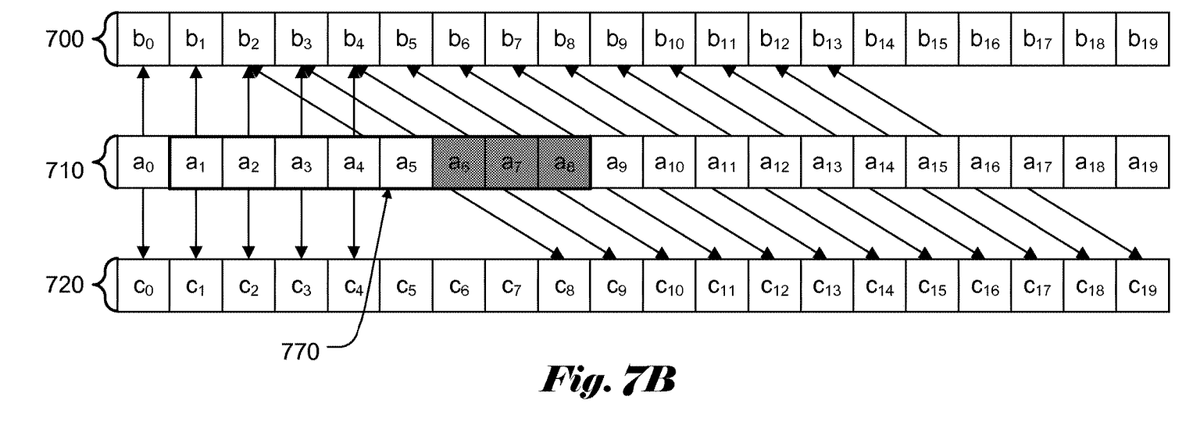
FIG. 7B illustrates an example of motion vectors determined based on the motion estimation of the two captured frames shown in FIG. 7B.

FIGS. 7A and 7B illustrate an example of the motion boundary located in the background. Different from the example shown in FIGS. 6A and 6B, the motion boundary consists of blocks locates in the background area. FIG. 7A is used to illustrate the matching result of frame 700 and frame 720. The bidirectional arrows show the relationship between matched blocks.

FIG. 7B illustrates the motion vectors obtained by using bidirectional motion estimation wherein each arrow shows the relationship between two reference blocks of each block being processed. Frame 710 is interpolated based on captured frame 700 and frame 710. As shown in FIG. 7B, motion boundary 770 consists of blocks $a_1$ to $a_8$. According to the actual situation illustrated by FIG. 7A, block $a_5$ should be interpolated by block $b_5$ and block $c_5$. However, the reference blocks of $a_5$ are $b_5$ and $c_8$ determined according to the present invention. As $b_5$ and $c_8$ are not matched with each other, the block difference such as SAD between these two blocks may be larger than that between block $b_5$ and block $c_5$. If the block difference for block $a_5$ is larger than the predicted block difference by a threshold, block $a_5$ is mistaken as an occlusion block. This results in a slight halo in the interpolated frame.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of detecting an occlusion area in a current image, the method comprising:
   determining a motion vector for a current block in the current image based on a first neighboring image and a second neighboring image, wherein the current image is temporally located between the first neighboring image and the second neighboring image;
   determining a block difference between a first reference block in the first neighboring image and a second reference block in the second neighboring image, wherein the first reference block and the second reference block are located using the current block and the motion vector for the current block;

determining a predicted block difference based on one or more neighboring block differences between respective reference blocks in the first neighboring image and the second neighboring image associated with one or more neighboring blocks in the current image and respective motion vectors thereof; and determining whether the current block is an occlusion block or not based on the block difference and the predicted block difference.

2. The method of claim 1, wherein the current block is determined to be one occlusion block if the block difference is larger than the predicted block difference by a threshold.

3. The method of claim 1, wherein said one or more neighboring blocks are not in any motion boundary.

4. The method of claim 1, wherein the predicted block difference is updated according to an average of the block difference and one or more neighboring block differences.

5. The method of claim 1 wherein the block difference corresponds to a sum of absolute differences (SAD) between values of corresponding pixels in the first reference block and the second reference block.

6. The method of claim 1, wherein the motion vector corresponds to a bidirectional motion vector determined based on both forward motion estimation and backward motion estimation between the first neighboring image and the second neighboring image.

7. The method of claim 6, wherein the bi-directional motion vector is related to a minimum block difference calculated between candidate reference blocks in the first neighboring image and the second neighboring image.

8. The method of claim 1, wherein the first reference block is located by offsetting a first location corresponding to the current block in the first neighboring image by the motion vector in one direction, and the second reference block is located by offsetting a second location corresponding to the current block in the second neighboring image by the motion vector in an opposite direction.

9. The method of claim 1, wherein the block difference is determined based on respective pixel differences between the first reference block and the second reference block.

10. An apparatus for detecting an occlusion area in a current image, the apparatus comprising:

a first circuit configured to determine a motion vector for a current block in the current image based on a first neighboring image and a second neighboring image, wherein the current image is temporally located between the first neighboring image and the second neighboring image;

a second circuit configured to determine a block difference between a first reference block in the first neighboring image and a second reference block in the second neighboring image, wherein the first reference block and the second reference block are located using the current block and the motion vector for the current block;

a third circuit configured to determine a predicted block difference between respective reference blocks in the first neighboring image and the second neighboring image based on one or more neighboring block differences associated with one or more neighboring blocks in the current image and respective motion vectors thereof, and a fourth circuit configured to determine whether the current block is an occlusion block based on the block difference and the predicted block difference.

11. The apparatus of claim 10, wherein said one or more neighboring blocks are not in any motion boundary.

12. The apparatus of claim 10, wherein the predicted block difference is updated according to an average of the block difference and one or more neighboring block differences.

13. The apparatus of claim 10, wherein the block difference corresponds to a sum of absolute differences (SAD) between values of corresponding pixels in the first reference block and the second reference block.

14. The apparatus of claim 10, wherein the current block is determined to be one occlusion block if the block difference is larger than the predicted block difference by a threshold.

15. The apparatus of claim 10, wherein the motion vector corresponds to a bidirectional motion vector determined based on both forward motion estimation and backward motion estimation between the first neighboring image and the second neighboring image.

16. The apparatus of claim 10, wherein the block difference is determined based on respective pixel differences between the first reference block and the second reference block.

* * * * *